US011394620B1

(12) United States Patent
Brailovskiy et al.

(10) Patent No.: US 11,394,620 B1
(45) Date of Patent: Jul. 19, 2022

(54) NETWORK PATTERN MATCHING

(71) Applicant: Amazon Technologies, Inc., Seattle, WA (US)

(72) Inventors: Ilya Vladimirovich Brailovskiy, Mountain View, CA (US); Varadarajan Gopalakrishnan, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/710,403

(22) Filed: Sep. 20, 2017

(51) Int. Cl.
*G06F 15/173* (2006.01)
*H04L 41/147* (2022.01)
*H04L 43/0888* (2022.01)
*H04L 43/10* (2022.01)
*H04L 41/5009* (2022.01)
*H04L 49/20* (2022.01)
*H04L 43/12* (2022.01)

(52) U.S. Cl.
CPC ........ *H04L 41/147* (2013.01); *H04L 41/5009* (2013.01); *H04L 43/0888* (2013.01); *H04L 43/10* (2013.01); *H04L 43/12* (2013.01); *H04L 49/205* (2013.01)

(58) Field of Classification Search
CPC ........ H04N 11/143; G10L 15/12; H04L 47/11
See application file for complete search history.

(56) References Cited

U.S. PATENT DOCUMENTS

| | | | | |
|---|---|---|---|---|
| 8,230,105 | B2* | 7/2012 | Melnyk | H04L 47/10 709/233 |
| 2011/0093605 | A1* | 4/2011 | Choudhury | H04L 67/303 709/231 |
| 2012/0141089 | A1* | 6/2012 | Hunt | H04N 21/23439 386/239 |
| 2013/0159495 | A1* | 6/2013 | Wang | H04N 19/146 709/224 |
| 2013/0326024 | A1* | 12/2013 | Chen | H04L 65/4084 709/219 |
| 2016/0044280 | A1* | 2/2016 | Yang | H04N 7/152 348/14.09 |
| 2016/0248684 | A1* | 8/2016 | Parthasarathy | H04L 69/22 |
| 2016/0277468 | A1* | 9/2016 | Rodbro | H04L 65/60 |
| 2017/0103672 | A1* | 4/2017 | Dey | G06F 3/0304 |
| 2018/0176325 | A1* | 6/2018 | Liang | H04L 65/4084 |
| 2019/0044633 | A1* | 2/2019 | Kobayashi | H04B 17/309 |

* cited by examiner

*Primary Examiner* — Umar Cheema
*Assistant Examiner* — Tesfu N Mekonen
(74) *Attorney, Agent, or Firm* — K&L Gates LLP

(57) ABSTRACT

Techniques are generally described for network pattern matching. In various examples, first data may be sent over a network at a first bit rate to a second device. A plurality of network congestion profiles of the network may be stored in a memory. Network conditions of the network may be determined over a first period of time. A correlation between the network conditions and a first network congestion profile of the plurality of network congestion profiles may be determined. A second bit rate may be determined based on the first network congestion profile. Second data may be sent over the network to the second device at the second bit rate.

19 Claims, 7 Drawing Sheets

US 11,394,620 B1

NETWORK PATTERN MATCHING

BACKGROUND

Video and/or other media may be streamed between computing devices over a network. The encoded video data may pass through multiple network components as it travels from the first device to the second. However, network conditions can change during transmission of the encoded video data for various reasons, and network conditions may sometimes deteriorate to a level that causes delays in the transmission of the encoded video. Technologies exist for dealing with changes in network conditions when transmitting data, but because these network condition changes may originate from a variety of sources, these technologies may not provide optimal solutions for every type of situation.

DETAILED DESCRIPTION

Figure 1:
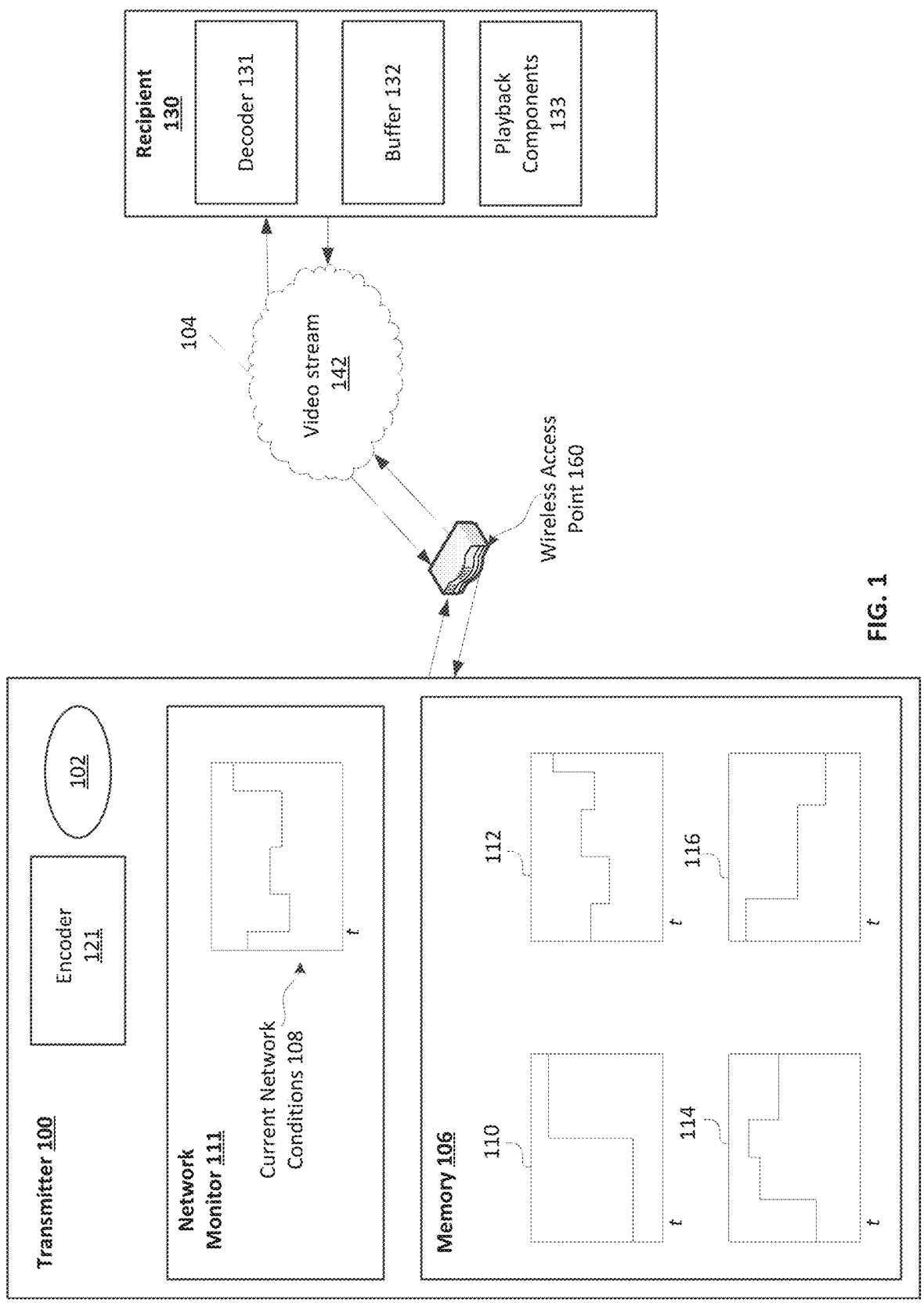
FIG. 1 depicts a system for performing network pattern matching, in accordance with various embodiments of the present disclosure.

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

In some examples, video data may be encoded by a first computing device and then sent to a second computing device, which decodes the video data while subsequent portions of the video are still being transmitted to the second computing device. Such video transmission and playback is often referred to as "streaming". In some other examples, videos and/or other media may be encoded by a first computing device and sent to one or more remote computing devices for further processing. Video may be encoded with various transmission attributes (e.g., bitrates, resolutions, profiles, frame rates, etc.) prior to sending the video over a network to a remote computing device. Web Real-Time Communication ("WebRTC") comprises a number of communication protocols and application programming interfaces ("APIs") that enable real time communication over peer-to-peer connections. WebRTC may use Real-time Transport Control Protocol ("RTCP") to transmit audio and/or video over a network.

In a WebRTC a sending device sends packets of encoded video that may be received and decoded by a recipient device. The packets of encoded video may be encoded based on current network conditions at the time of the encoding. For example, an encoder of the sending device may encode a video stream at a first bitrate based on current network conditions. Thereafter, network conditions may deteriorate due to increased network traffic and congestion. Accordingly, the end-to-end time between sending a packet of the video by the sending device and receipt of the packet by the recipient device may increase (e.g., the latency may increase). In response to the slowed network conditions, the recipient device may send a Receiver Estimated Maximum Bitrate ("REMB") message. The REMB message may include a field to convey the total estimated available bitrate on the network path to the receiving side of the real-time transport protocol ("RTP") session (e.g., the connection between the sending device and the recipient device). The sending/encoding device may use the bitrate specified in the REMB message to configure the maximum bitrate of the video encoding.

Such a scenario typically works well when there is a gradual change in network quality (e.g., a gradual change in bandwidth). However, WebRTC and other real-time multimedia communication over the Internet is subject to the unpredictability of the best-effort IP network. Packet loss, packet re-ordering, and variable queuing delay can cause erratic delays in the network path between sender and recipient. Additionally, wireless internet connections may be prone to bursty losses, interference and congestion. Further, in wireless connections, decreased bandwidth, connectivity issues, and/or increased packet loss may be experienced based on the distance between a device and the wireless access point as well as based on interference in the wireless signal. Additionally, buffer-bloat and drop-tail queues in routers or other access points can cause long delays and bursty losses.

Detecting network behavior patterns and storing common, representative patterns may allow WebRTC traffic and/or other encoded data to be dynamically encoded by matching the network conditions to a stored network-condition pattern. Accordingly, changing network conditions may be anticipated based on historical data for a given locality and/or access point. The transmitting device may dynamically encode data according to the anticipated network conditions based on the historical network data to improve the quality of the video stream. Further, various techniques may be used to account for time variation between stored network behavior profiles and current network conditions, in order to provide increased flexibility of the various solutions provided herein.

FIG. 1 depicts a system for performing network pattern matching, in accordance with various embodiments of the present disclosure. The system in FIG. 1 may comprise a transmitter 100 (e.g., a computing device) effective to encode a video stream for delivery to one or more recipients 130 (e.g., client computing devices) over a network 104, in accordance with various embodiments of the present disclosure. Network 104 may be, for example, a local area network (LAN) and/or a wide area network (WAN) such as the Internet. In various examples, transmitter 100 may access network 104 via a wireless access point 160. Wireless access point 160 may be, for example, a router and/or a network switch. In at least some other examples, transmitter 100 may access network 104 via a wired connection.

In various examples, a video stream may be sent from transmitter 100 as video stream 142. Video stream 142 may include multiple renditions or may include a single rendition. Video stream 142 may be organized into video frames by encoder 121 of transmitter 100. A video frame may be, for example, a raster of pixels, with each pixel comprising a pixel value. Video frames may be sent from transmitter 100 over network 104 and received and presented by recipients 130 using streaming technology. In various examples, a portion of the video stream may be presented by a recipient while subsequent portions of the video stream are simultaneously being sent to the recipient 130. In some other examples, video stream 142 may be sent to recipient 130 so that recipient 130 can further process the video or store the video in a non-transitory, computer-readable memory.

In further examples, a prior portion of a video stream may be decoded and displayed by a recipient at the same time that a subsequent portion of the video stream 142 is still being sent to the recipient. In some examples, the encoded and transmitted image information may correspond to a live or nearly-live (e.g., with a short time delay of, for example, less than a few tenths of a second, less than a few seconds or less than a few minutes) transmission of an event, such as a playing of a video game, a news conference, real-time video conferencing, a sporting event, surveillance video, and many others. A live or nearly-live transmission of an event that is delivered using streaming technology may be referred to as live-streaming. It is noted however, that the transmission of information depicted in FIG. 1 is not limited to live or nearly-live transmission and may also include sending prior-recorded events, media, or other information.

Transmitter 100 may comprise at least one processor 102 and a non-transitory, computer-readable memory 106. Memory 106 may be effective to store instructions that when executed by at least one processor 102 are effective to perform the various network pattern matching techniques and dynamic encoding techniques described herein. In various examples, transmitter 100 may further comprise a network monitor 111. Network monitor 111 may be hardware or software effective to monitor network conditions 108 experienced by transmitter 100. In some examples, network monitor 111 may be effective to monitor bandwidth, latency, round trip time ("RTT"), jitter, packet loss (e.g., a percentage of packets lost), signal to noise ratio ("SNR"), received signal strength indicator ("RSSI"), etc. In some examples, network monitor 111 may monitor data received from a local access point, such as wireless access point 160, to network 104. In some examples, current network conditions 108 may be monitored and/or detected as a time graph, as shown in FIG. 1. In various examples, the time graph data representing current network conditions 108 may conclude with a current time. In other examples, the time graph data representing current network conditions 108 may represent a period of time over which the sampling, monitoring and/or detection of network conditions occurs. For example, the time period represented in the time graph data of current network conditions 108 may be 5 milliseconds, 50 milliseconds, 100 milliseconds, 300 milliseconds, 1 second, 2 seconds, 3 seconds, or any other amount of time, as desired. The time graph data may represent a measure of a first network condition (e.g., bandwidth, RTT, latency, etc.) of a wireless network detected over a first period of time.

Memory 106 may be effective to store representations of past and/or typical network conditions. In the example depicted in FIG. 1, memory 106 may store network congestion profiles 110, 112, 114 and 116. The network congestion profiles of network conditions stored in memory 106 may comprise historical network-related statistical data detected by network monitor 111 at a previous time. Additionally, the network congestion profiles stored in memory 106 may represent historical averages of network conditions for particular time periods. For example, network congestion profile 110 may represent the average available bandwidth detected by network monitor 111 on Mondays between the hours of 1 PM and 3 PM for the last year. In some other examples, instead of being detected by network monitor 111, the various network congestion profiles may be provided by an internet service provider, gateway server, access point, etc.

Network congestion profiles stored in memory 106 (e.g., network congestion profiles 110, 112, 114, 116, etc.) may be generated by network monitor 111 based on varying traffic density within different types of spaces. Hourly variation, day-by-day variation, week-by-week variation may be seen in a given environment. For example, in single family homes higher network traffic and/or reduced bandwidth may typically be the result of increased retransmission. However, network interference in single family homes is typically not an issue. Peak traffic patterns in single family homes typically occur in the evening and in the early part of the day, but much less during the day. By contrast, multiple family dwellings (e.g., apartment buildings) typically have multiple access points. Traffic in multiple family homes typically does not dip during the day and network interference may drive retransmission of packets. Condominiums typically exhibit network conditions with characteristics between those of a single family home and those of a multiple family apartment building. Accordingly, network congestion profiles (including network congestion profiles 110, 112, 114, 116, etc.) may be based on the type of environment in which transmitter 100 is operating.

As described in further detail below, the at least one processor 102 may perform a correlation analysis against the network congestion profiles stored in memory. In various examples, the correlation analysis may proceed from a current time of the current network conditions 108 backwards to match the curves of current network conditions 108 to a portion of one of the network congestion profiles stored in memory 106. A shape function of the current network conditions 108, as detected by network monitor 111, may be correlated with a portion of one or more of the network congestion profiles. Once a particular network congestion profile is chosen, future bandwidth may be estimated and encoder 121 may encode video stream 142 at a bitrate chosen according to the estimated bandwidth.

For example, current network conditions 108 may be represented by a time graph of available bandwidth vs. time, as depicted in FIG. 1. Processor 102 may use dynamic time warping and/or other correlation methods to determine a correspondence between current network conditions 108 and network congestion profile 112. In various examples, a portion of network congestion profile 112 may most closely resemble current network conditions 108 from among the network congestion profiles stored in memory 106 (e.g., from among network congestion profiles 110, 112, 114, and 116). In the example, processor 102 may determine a point in time in the time graph of network congestion profile 112 corresponding to the current time. In the example, network congestion profile 112 may indicate that network conditions are about to deteriorate and that the amount of available bandwidth is likely to sharply decline in the near future following the point in network congestion profile 112 corresponding to the current time (e.g., within 0.1 seconds, 0.03 seconds, 1 second, etc.). Accordingly, encoder 121 may begin encoding frames of video stream 142 with a lower bitrate relative to the current bitrate. Processor 102 may determine that the lower bitrate has a reduced likelihood of causing undesirable network conditions (e.g., increased latency, jitter, buffer-overflow, etc.), even in the event that the bandwidth declines as indicated by network congestion profile 112.

Recipient 130 may be a computing device to which video stream 142 is sent by transmitter 100. In various examples, recipient 130 may be a client device where the video of video stream 142 is played back. In some other examples, recipient 130 may be effective to perform image processing techniques (e.g., computer vision techniques) on video stream 142. Recipient 130 may comprise a decoder 131 effective to decode the encoded frames of video stream 142 sent by transmitter 100. Additionally, recipient 130 may comprise a buffer 132 effective to store one or more reference frames of video stream 142 for use in decoding inter-coded frames of video 142. In at least some examples, recipient 130 may include playback components 133 effective to play video stream 142.

In at least some examples, recipient 130 may continue to send REMB messages, as described above. For example, an REMB message may indicate that the estimated bitrate available on the network path between transmitter 100 and recipient 130 is lower than expected based on one or more of the network congestion profiles stored in memory 106. In response to receipt of such a message, transmitter 100 may again attempt to correlate the current network conditions 108 with one or more network congestion profiles stored in memory 106, to determine if a better correlation exists based on the current network conditions 108. If a better correlation exists (relative to a current or previous correlation between a network congestion profile and current network conditions 108), the at least one processor 102 may control encoder 121 to encode frames of video stream 142 at a bitrate that is unlikely to cause delays according to the newly chosen network congestion profile. However, in some examples, if no better correlation exists relative to the current network congestion profile being used as a basis of encoding video stream 142, encoder 121 may adopt the bitrate indicated in the REMB message sent by recipient 130.

Figure 2:
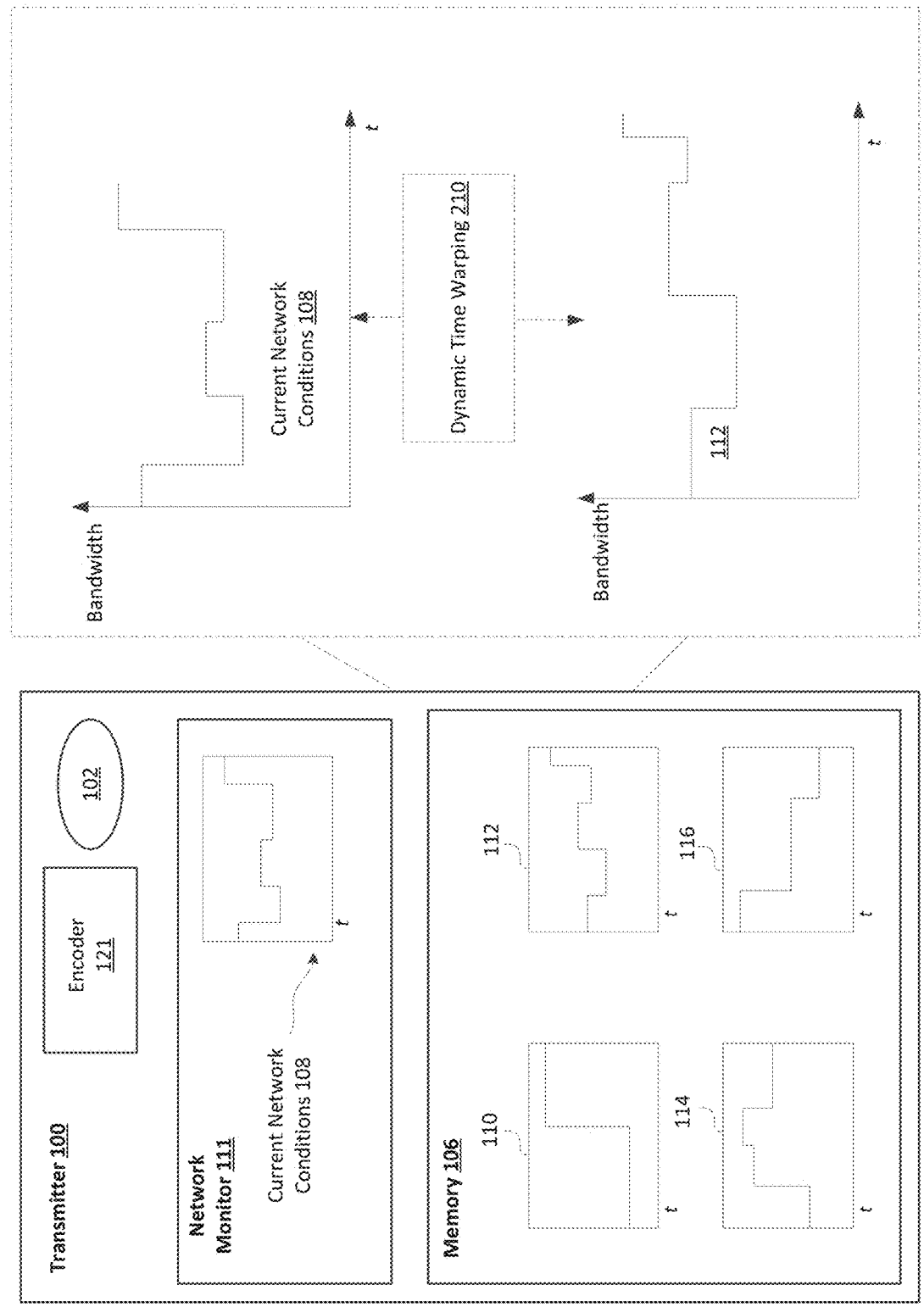
FIG. 2 depicts an example of network pattern matching using dynamic time warping, in accordance with various aspects of the present disclosure.

FIG. 2 depicts an example of network pattern matching using dynamic time warping, in accordance with various aspects of the present disclosure. The at least one processor 102 of transmitter 100 may perform dynamic time warping 210 to correlate the current network conditions 108 with the network congestion profiles stored in memory 106 to determine a closest match between the current network conditions 108 and at least a portion of one of the network congestion profiles stored in memory 106. In at least some examples, the time period of the various network congestion profiles may be larger than the time period of the current network conditions 108. Accordingly, determining a correlation or "match" between the current network conditions 108 and one or more of the network congestion profiles may comprise correlating the time graph data of current network conditions 108 to a portion of the time graph data of the network congestion profiles. In various examples, dynamic time warping 210 may generate a similarity score indicating the similarity between the two time graphs being compared and/or portions and/or waveforms of the two time graphs being compared. Dynamic time warping 210 non-linearly warps the functions depicted in the time graph in the time dimension in order to determine the similarity between the functions independent of non-linear variations in the time dimension. The similarity (or correlation) between the functions is represented by the similarity score. Accordingly, comparison of current network conditions 108 to the plurality network congestion profiles stored in memory may generate a corresponding plurality of similarity scores. The network congestion profile with the highest similarity score may be selected as corresponding most strongly to the current network conditions 108. Accordingly, the network congestion profile with the highest similarity score may be used by the at least one processor 102 to predict future network conditions.

Non-linearly warping the functions in the time dimension allows the similarity value to be determined independent of non-linear variations in the time dimension between the two time graphs being compared. Accordingly, although network conditions may improve, deteriorate, or otherwise change at different times in the network congestion profile 112 relative to current network conditions 108, dynamic time warping 210 may nonetheless be used to determine that the two time graphs are strongly correlated. Accordingly, dynamic time warping 210 may generate a high similarity value for the comparison of current network conditions 108 and network congestion profile 112 relative to comparisons of current network conditions 108 with other network congestion profiles stored in memory 106. Dynamic time warping 210 may maximize the similarity (e.g., minimize the difference) between one or more waveforms of current network conditions 108 and other network congestion profiles stored in memory 106.

In various examples, cross correlation techniques, normalized cross correlation techniques and/or a lookup operation may be performed in addition to or in lieu of the dynamic time warping techniques described above in order to determine a similarity between current network conditions 108 and a network congestion profile stored in memory 106. In examples where a lookup operation is used to determine a correlation between current network conditions 108 and a network congestion profiles stored in memory, the network congestion profiles may be embodied in the lookup tables or other data structures.

In various examples, the network congestion profiles stored in memory 106 may be weighted according to network statistics tracked by the at least one processor 102 and/or by network monitor 111. For example, if transmitter 100 is in a densely populated urban environment, network congestion profiles common to urban areas may be weighted more heavily relative to other network congestion profiles. Similarly, if transmitter 100 is in a remote, rural area, network congestion profiles common to such areas may be more heavily weighted.

In various other examples, normalized cross-correlation may be used in place of or in addition to dynamic time warping 210 to determine correlations between current network conditions 108 and network congestion profiles stored in memory 106. In various other examples, a neural network may be trained to correlate current network conditions 108 and network congestion profiles stored in memory 106.

Figure 3:
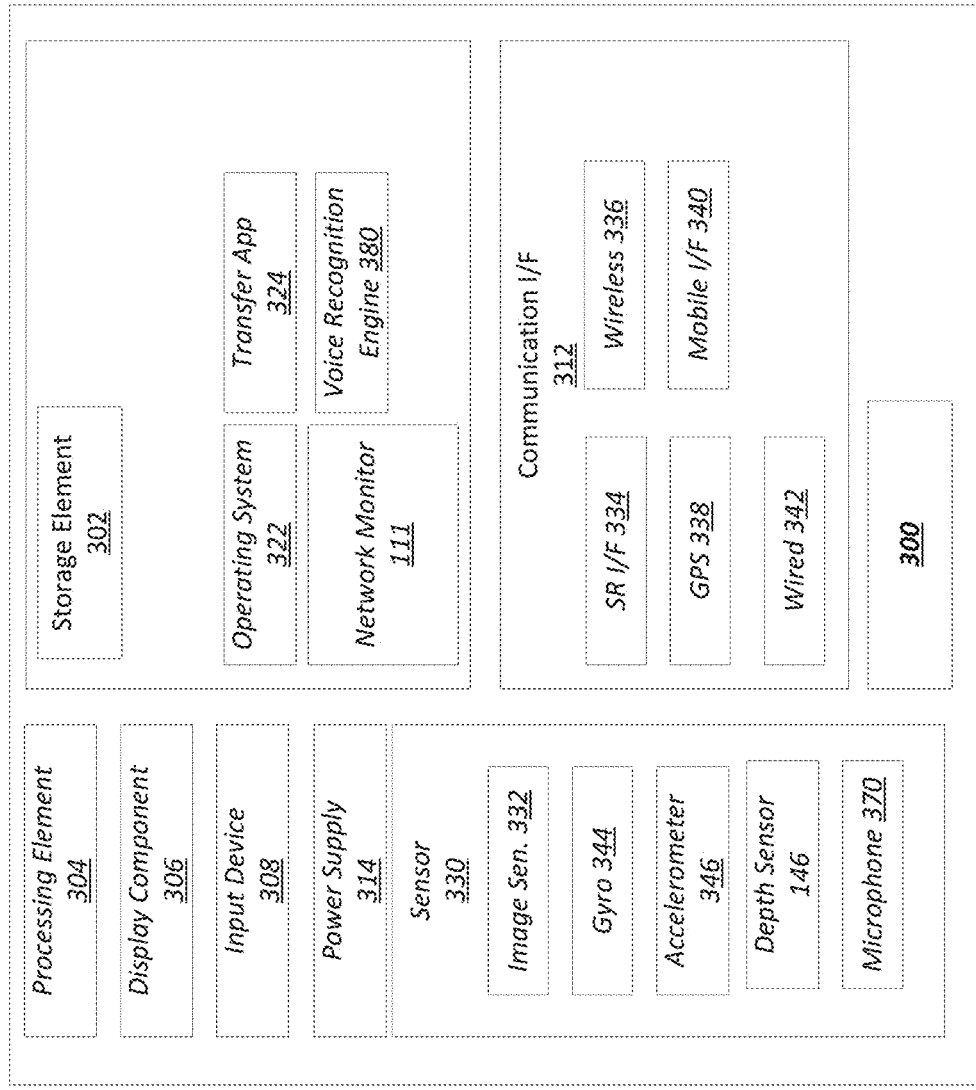
FIG. 3 depicts a recipient computing device effective to perform network pattern matching, in accordance with embodiments of the present disclosure.

FIG. 3 is a block diagram showing an example architecture 300 of a user device, such as the transmitter 100, recipient 130, and/or other computing devices described herein. It will be appreciated that not all user devices will include all of the components of the architecture 300 and some user devices may include additional components not shown in the architecture 300. The architecture 300 may include one or more processing elements 304 for executing instructions and retrieving data stored in a storage element 302. The processing element 304 may comprise at least one processor. Any suitable processor or processors may be used. For example, the processing element 304 may comprise one or more digital signal processors (DSPs). In some examples, the processing element 304 may be effective to perform object segmentation techniques for image data, as described above. The storage element 302 can include one or more different types of memory, data storage, or computer-readable storage media devoted to different purposes within the architecture 300. For example, the storage element 302 may comprise flash memory, random-access memory, disk-based storage, etc. Different portions of the storage element 302, for example, may be used for program instructions for execution by the processing element 304, storage of images or other digital works, and/or a removable storage for transferring data to other devices, etc.

The storage element 302 may also store software for execution by the processing element 304. An operating system 322 may provide the user with an interface for operating the user device and may facilitate communications and commands between applications executing on the architecture 300 and various hardware thereof. A transfer application 324 may be configured to send and/or receive image and/or video data to and/or from other devices (e.g., a mobile device, remote device, image capture device, and/or display device). In some examples, the transfer application 324 may also be configured to upload the received images to another device that may perform processing as described herein (e.g., a mobile device or another computing device).

In various examples, a network monitor 111 may be effective to monitor network conditions of a network over which a device represented by architecture 300 is communicating. Network monitor 111 may be effective to provide data related to available bandwidth, jitter, latency, RTT, end to end time, SNR, etc. on the network. Processing element 304 may be effective to correlate current network conditions detected by network monitor 111 with network congestion profiles stored in storage element 302 or within another memory of architecture 300. Processing element 304 may instruct an encoder of architecture 300 to encode video with a different bitrate based on an anticipated improvement or deterioration of network conditions indicated in a network congestion profile that is correlated with current network conditions.

When implemented in some user devices, the architecture 300 may also comprise a display component 306. The display component 306 may comprise one or more light-emitting diodes (LEDs) or other suitable display lamps. Also, in some examples, the display component 306 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 300 may also include one or more input devices 308 operable to receive inputs from a user. The input devices 308 can include, for example, a push button, touch pad, touch screen, wheel, joystick, keyboard, mouse, trackball, keypad, light gun, game controller, or any other such device or element whereby a user can provide inputs to the architecture 300. These input devices 308 may be incorporated into the architecture 300 or operably coupled to the architecture 300 via wired or wireless interface. In some examples, architecture 300 may include a microphone 370 for capturing sounds, such as voice commands. Voice recognition engine 380 may interpret audio signals of sound captured by microphone 370. In some examples, voice recognition engine 380 may listen for a "wake word" to be received by microphone 370. Upon receipt of the wake word, voice recognition engine 380 may stream audio to a voice recognition server for analysis. In various examples, voice recognition engine 380 may stream audio to external computing devices via communication interface 312.

When the display component 306 includes a touch-sensitive display, the input devices 308 can include a touch sensor that operates in conjunction with the display component 306 to permit users to interact with the image displayed by the display component 306 using touch inputs (e.g., with a finger or stylus). The architecture 300 may also include a power supply 314, such as a wired alternating current (AC) converter, a rechargeable battery operable to be recharged through conventional plug-in approaches, or through other approaches such as capacitive or inductive charging.

The communication interface 312 may comprise one or more wired or wireless components operable to communicate with one or more other user devices. For example, the communication interface 312 may comprise a wireless communication module 336 configured to communicate on a network, such as the network 104, according to any suitable wireless protocol, such as IEEE 802.11 or another suitable wireless local area network (WLAN) protocol. A short range interface 334 may be configured to communicate using one or more short range wireless protocols such as, for example, near field communications (NFC), Bluetooth, Bluetooth LE, etc. A mobile interface 340 may be configured to communicate utilizing a cellular or other mobile protocol. A Global Positioning System (GPS) interface 338 may be in communication with one or more earth-orbiting satellites or other suitable position-determining systems to identify a position of the architecture 300. A wired communication module 342 may be configured to communicate according to the USB protocol or any other suitable protocol.

The architecture 300 may also include one or more sensors 330 such as, for example, one or more position sensors, image sensors, and/or motion sensors. An image sensor 332 is shown in FIG. 3. Some examples of the architecture 300 may include multiple image sensors 332. For example, a panoramic camera system may comprise multiple image sensors 332 resulting in multiple images and/or video frames that may be stitched and may be blended to form a seamless panoramic output.

Motion sensors may include any sensors that sense motion of the architecture including, for example, gyro sensors 344 and accelerometers 346. Motion sensors, in some examples, may be used to determine an orientation, such as a pitch angle and/or a roll angle of a camera. The gyro sensor 344 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 346 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 338 may be utilized as a motion sensor. For example, changes in the position of the architecture 300, as determined by the GPS interface 338, may indicate the motion of the GPS interface 338.

In some examples, architecture 300 may include a depth sensor 146. Depth sensor 146 may be effective to determine a distance between image sensor 332 and a surface detected by depth sensor 146. In some examples, the depth sensor 146 may determine the contours of the surface and may be capable of using computer vision techniques to recognize facial patterns or other markers within the field of view of the depth sensor 146's infrared sensor. In some examples, the depth sensor 146 may include an infrared projector and camera. Processing element 304 may build a depth map based on detection by the infrared camera of a pattern of structured light displayed on a surface by the infrared projector. In some other examples, the depth sensor 146 may include a time of flight camera that may compute distance based on the speed of light by measuring the time of flight of a light signal between a camera of the depth sensor 146 and a surface of an environment. In some examples, processing element 304 may be effective to determine the location of various objects in the physical environment within the field of view of image sensor 332 based on the depth map created by the depth sensor 146. As noted above, in some examples, non-infrared depth sensors, such as passive stereo camera pairs, or non-identical camera pairs, may be used in place of, or in addition to, infrared light sources of depth sensor 146.

Figure 4:
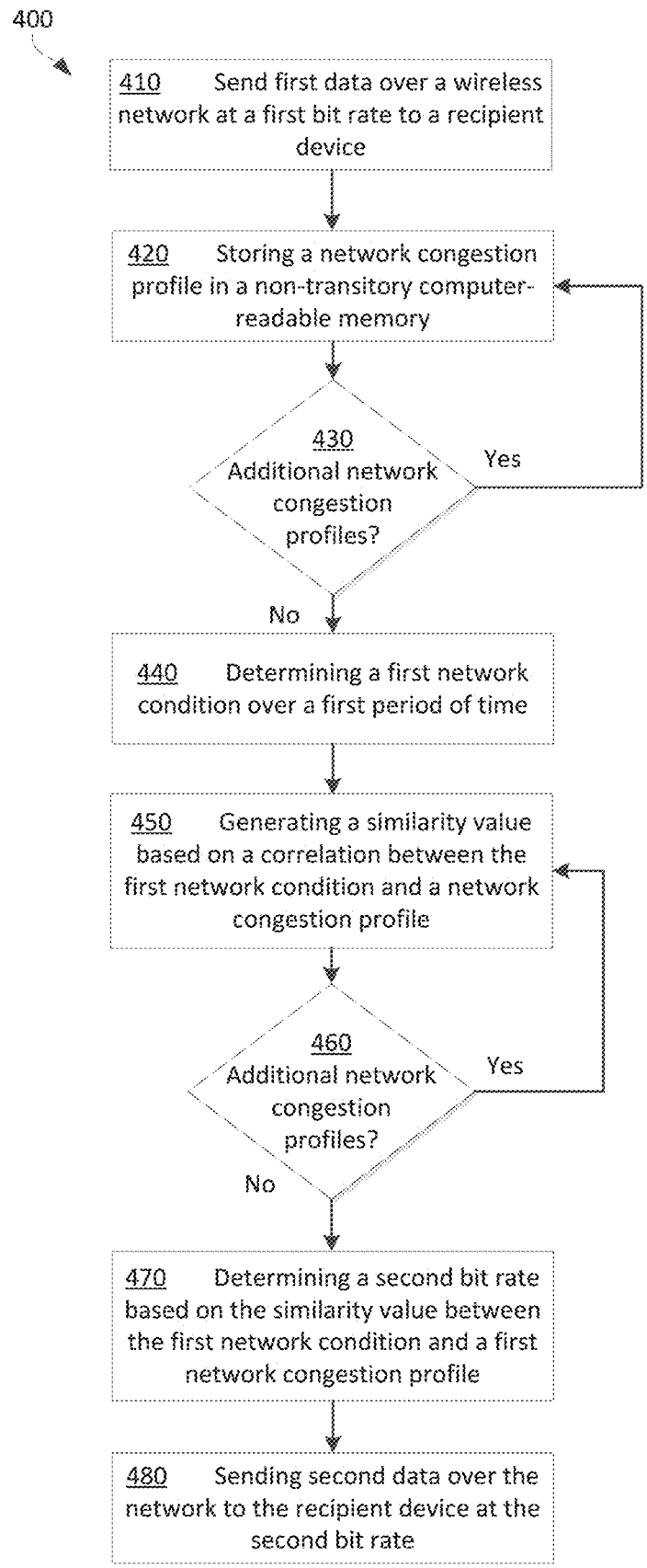
FIG. 4 depicts a flowchart illustrating an example process for performing network pattern matching, in accordance with various embodiments of the present disclosure.

FIG. 4 is a flowchart 400 illustrating a first example process for performing network pattern matching that may be used in accordance with the present disclosure. In some examples, the process of FIG. 4 may be performed by a transmitter computing device (e.g., server) that sends video to one or more other computing devices. For example, the process described in FIG. 4 may be performed by transmitter 100 depicted in FIG. 1. In some examples, transmission of a video may be sent as part of a broadcast to multiple recipients, such as a large-scale video broadcast. In some examples, the requested video stream may be sent using a communications protocol that is commonly employed for adaptive bitrate streaming, such as hypertext transfer protocol (HTTP). In some other examples, the process of FIG. 4 may be performed prior to receiving a request for a video streaming transmission. For example, the process of FIG. 4 may be performed to encode video data received from a camera or other device for later transmission or streaming.

The process of FIG. 4 may begin at operation 410, "Send first data over a wireless network at a first bit rate to a recipient device." At operation 410, first video data may be encoded at a first bit rate and sent to a recipient device for playback and/or for further processing. In various examples, the first data may be sent over a wireless network.

In various examples, operations 420 and 430 may be optional. In examples where operation 420 and/or 430 are included in the process of flowchart 400, the process may continue from operation 410 to operation 420, "Storing a network congestion profile in a non-transitory computer-readable memory." At operation 420, a network congestion profile may be stored in a memory. In at least some examples, the memory may be a memory of transmitter 100 (depicted in FIG. 1). In other examples, the memory may be a memory configured in communication with transmitter 100. The network congestion profile may be, for example, historical data representing a time graph of a network condition of network 104 (depicted in FIG. 1) or of another network. In various examples, the condition may be bandwidth, round trip time ("RTT"), jitter, packet loss, signal to noise ratio ("SNR"), received signal strength indicator ("RSSI"), etc. In other examples, the network congestion profile may be sent to transmitter 100 from a remote computing device and may reflect common network conditions as determined by an internet service provider associated with transmitter 100 and/or other computing device configured to monitor and/or estimate network conditions on network 104. Although operation 420 follows operation 410 in flowchart 400, in at least some examples, operation 420 and 430 may precede operation 410.

In examples where operation 420 and/or 430 are included in the process of flowchart 400, the process may continue from operation 420 to operation 430 at which a determination may be made whether or not additional network congestion profiles are available to be stored in memory. After all network congestion profiles are stored in memory, processing may proceed from operation 430 to operation 440, "Determining a first network condition over a first period of time". At operation 440, transmitter 100 and/or network monitor 111 may determine a first network condition over a first period of time. In various examples, the first network condition may be a first network condition occurring over the past 10 seconds, 5 seconds 50 milliseconds or any other period of time. For example, transmitter 100 and/or network monitor 111 may monitor bandwidth, round trip time ("RTT"), jitter, packet loss, signal to noise ratio ("SNR"), received signal strength indicator ("RSSI"), etc. on network 104 over a period of time. The particular parameter of network 104 monitored may be based on the network congestion profiles stored in memory. For example, if the network congestion profiles stored in the memory comprise time graphs that show average RTT of packets, determining current network conditions at operation 440 may comprise determining average RTT of packets being sent over network 104.

The process may continue from operation 440 to operation 450, "Generating a similarity value based on a correlation between the first network condition and a network congestion profile." At operation 450, the first network condition determined by transmitter 100 and/or network monitor 111 may be compared to one or more of the network congestion profiles stored in memory. In at least some examples, dynamic time warping may be used to determine a correlation between the first network conditions and the network congestion profile. In various examples, the first network condition may be a current network condition or a network condition monitored over a previous period of time (e.g., the last 2 seconds, 50 milliseconds, 0.5 milliseconds, etc.). The similarity value may be determined based on the correlation. One similarity value may be generated for each comparison. At operation 460, a determination may be made whether there are additional network congestion profiles with which to compare the first network condition. If so, further similarity values may be generated. If not, the process may continue from operation 460 to operation 470.

At operation 470, a second bit rate may be determined based on a similarity value between the first network condition and a first network congestion profile. In at least some examples, the similarity value between the first network condition and the first network congestion profile may be the highest similarity score among the comparisons made between the first network condition determined at operation 440 and the various network congestion profiles stored in memory, indicating that the first network congestion profile is more statistically similar to the first network condition relative to the other network congestion profiles stored in the memory. The second bit rate may be determined by transmitter 100 based on current and future network conditions indicated by the first network congestion profile. The second bit rate may be selected in order to maximize video quality and reduce packet loss, jitter, latency, buffer overflow and/or other unfavorable network and/or playback conditions. For example, if the first network congestion profile indicates that increased bandwidth will be available at a first time, transmitter 100 may determine that the video stream 142 may be encoded using a higher bit rate when the first time is reached. Similarly, if the first network congestion profile indicates that the network conditions are about to deteriorate, transmitter 100 may determine that the video stream 142 may be encoded using a lower bit rate in order to maintain quality and reduce network and/or playback issues.

The process may proceed from operation 470 to operation 480, "Sending second data over the network to the recipient device at the second bit rate." At operation 480, transmitter 100 may send second data (e.g., video stream 142) over network 104 to the recipient device 130 at the second bit rate. In various examples, the second bit rate may be different from the first bit rate and may be chosen according to the techniques described above.

Figure 5:
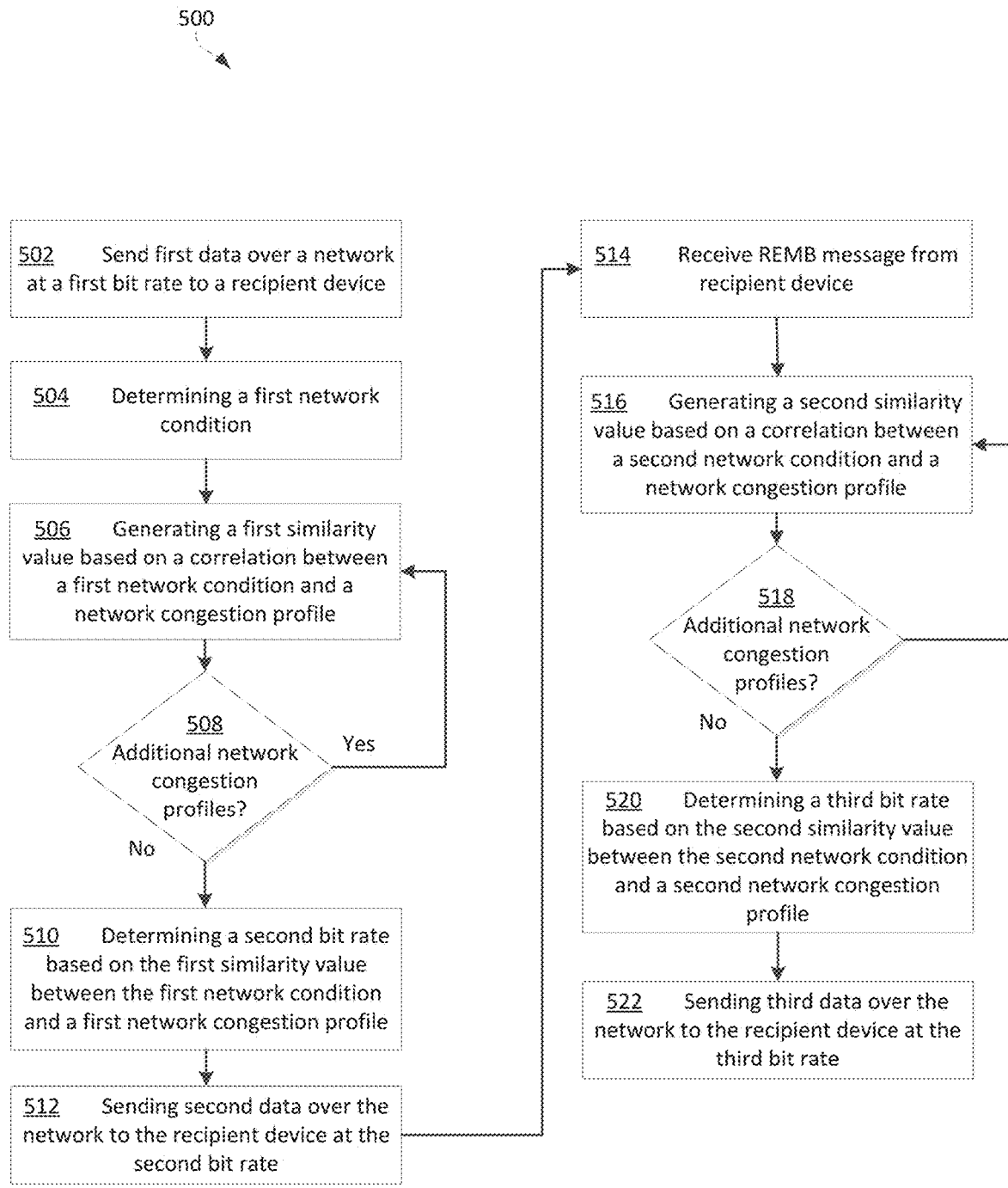
FIG. 5 depicts a flowchart illustrating another example process for performing network pattern matching, in accordance with embodiments of the present disclosure.

FIG. 5 depicts a flowchart 500 illustrating a second example process for performing network pattern matching that may be used in accordance with the present disclosure. In some examples, the process of FIG. 5 may be performed by a transmitter computing device (e.g., server) that sends video to one or more other computing devices. For example, the process described in FIG. 5 may be performed by transmitter 100 depicted in FIG. 1. In some examples, transmission of a video may be sent as part of a broadcast to multiple recipients, such as a large-scale video broadcast. In some examples, the requested video stream may be sent using a communications protocol that is commonly employed for adaptive bitrate streaming, such as hypertext transfer protocol (HTTP). In some other examples, the process of FIG. 5 may be performed prior to receiving a request for a video streaming transmission. For example, the process of FIG. 5 may be performed to encode video data received from a camera or other device for later transmission or streaming.

The process of FIG. 5 may begin at operation 502, "Send first data over a network at a first bit rate to a recipient device." At operation 502, first video data may be encoded at a first bit rate and sent to a recipient device for playback and/or for further processing.

The process may continue from operation 502 to operation 504, "Determining a first network condition." At operation 504, transmitter 100 and/or network monitor 111 may determine a first network condition. In various examples, the first network condition may be a current network condition. In some further examples, the first network condition may be determined over a preceding amount of time (e.g., the previous 5 seconds, 1 second, 2 minutes, 0.01 seconds, 0.001 seconds, or any other amount of time). For example, transmitter 100 and/or network monitor 111 may monitor bandwidth, round trip time ("RTT"), jitter, packet loss, signal to noise ratio ("SNR"), received signal strength indicator ("RSSI"), etc. on network 104. The particular parameter of network 104 monitored may be based on the network congestion profiles stored in memory. For example, if the network congestion profiles stored in the memory comprise time graphs that show average RTT of packets, determining the first network condition at operation 440 may comprise determining average RTT of packets being sent over network 104.

The process may continue from operation 504 to operation 506, "Generating a first similarity value based on a correlation between the first network condition and a network congestion profile." At operation 506, the first network condition determined by transmitter 100 and/or network monitor 111 may be compared to one or more of the network congestion profiles stored in memory. In at least some examples, dynamic time warping may be used to determine a correlation between the first network condition and the network congestion profile. The first similarity value may be determined based on the correlation. One first similarity value may be generated for each comparison. At operation 508, a determination may be made whether there are additional network congestion profiles with which to compare the first network condition. If so, further similarity values may be generated. If not, the process may continue from operation 508 to operation 510.

At operation 510, a second bit rate may be determined based on a first similarity value between the first network condition and a first network congestion profile. In at least some examples, the first similarity value between the first network condition and the first network congestion profile may be the highest similarity score among the comparisons made between the first network condition determined at operation 504 and the various network congestion profiles stored in memory, indicating that the first network congestion profile is more statistically similar to the first network condition relative to the other network congestion profiles stored in the memory. The second bit rate may be determined by transmitter 100 based on current and future network conditions indicated by the first network congestion profile. The second bit rate may be selected in order to maximize video quality and reduce packet loss, jitter, latency, buffer overflow and/or other unfavorable network and/or playback conditions. For example, if the first network congestion profile indicates that increased bandwidth will be available at a first time, transmitter 100 may determine that the video stream 142 may be encoded using a higher bit rate when the first time is reached. Similarly, if the first network congestion profile indicates that the network conditions are about to deteriorate, transmitter 100 may determine that the video stream 142 may be encoded using a lower bit rate in order to maintain quality and reduce network and/or playback issues.

The process may proceed from operation 510 to operation 512, "Sending second data over the network to the recipient device at the second bit rate." At operation 512, transmitter 100 may send second data (e.g., a portion of video stream 142) over network 104 to the recipient 130 at the second bit rate. In various examples, the second bit rate may be different from the first bit rate and may be chosen according to the techniques described above.

In at least some examples, the process may proceed from operation 512 to operation 514, "Receive REMB message from recipient device." At operation 514, an REMB message may be received from recipient device 130. In some examples, the REMB message may provide a maximum bitrate at which transmitter 100 should encode video stream 142 and/or other data for transmission over network 104 to recipient device 130. In other examples, the REMB message may provide network condition statistics describing the conditions on one or more network paths between transmitter 100 and recipient device 130. In examples where REMB message comprises network condition statistics, transmitter 100 may be configured to use the network condition statistics to determine a bit rate at which to encode data for transmission to recipient device 130. Transmitter 100 may select a bit rate based on the network condition statistics that will minimize unfavorable network conditions and/or playback issues.

The process may proceed from operation 514 to operation 516, "Generating a second similarity value based on a correlation between the first network condition and a network congestion profile." At operation 516, the first network condition determined by transmitter 100 and/or network monitor 111 may be compared to one or more of the network congestion profiles stored in memory to determine whether or not a different network congestion profile is more strongly correlated with the first network condition. Although not depicted in FIG. 5, in at least some examples, transmitter 100 may determine a second network condition following the receipt of the REMB message. In at least some examples, dynamic time warping may be used to determine a correlation between the second network condition and the network congestion profile. The first second similarity value may be determined based on the correlation. One second similarity value may be generated for each comparison. At operation 518, a determination may be made whether there are additional network congestion profiles with which to compare the second network condition. If so, further similarity values may be generated. If not, the process may continue from operation 518 to operation 520.

At operation 520, a third bit rate may be determined based on the second similarity value between the second network condition and a second network congestion profile. In at least some examples, the second similarity value between the second network condition and the second network congestion profile may be the highest similarity score among the comparisons made between the second network condition determined after receiving the REMB message at operation 514 and the various network congestion profiles stored in memory. The second similarity value may indicate that the second network congestion profile is now more statistically similar to the second network condition relative to the other network congestion profiles stored in the memory, including the first network congestion profile. The third bit rate may be determined by transmitter 100 based on current and future network conditions indicated by the second network congestion profile. The third bit rate may be selected in order to maximize video quality and reduce packet loss, jitter, latency, buffer overflow and/or other unfavorable network and/or playback conditions. For example, if the second network congestion profile indicates that increased bandwidth will be available at a first time, transmitter 100 may determine that the video stream 142 may be encoded using a higher bit rate when the first time is reached. Similarly, if the second network congestion profile indicates that the network conditions are about to deteriorate, transmitter 100 may determine that the video stream 142 may be encoded using a lower bit rate in order to maintain quality and reduce network and/or playback issues.

The process may proceed from operation 520 to operation 522, "Sending third data over the network to the recipient device at the third bit rate." At operation 522, transmitter 100 may send third data (e.g., a portion of video stream 142) over network 104 to the recipient device 130 at the third bit rate. In various examples, the third bit rate may be different from one or more of the first bit rate and the second bit rate, and may be chosen according to the techniques described above.

Figure 6:
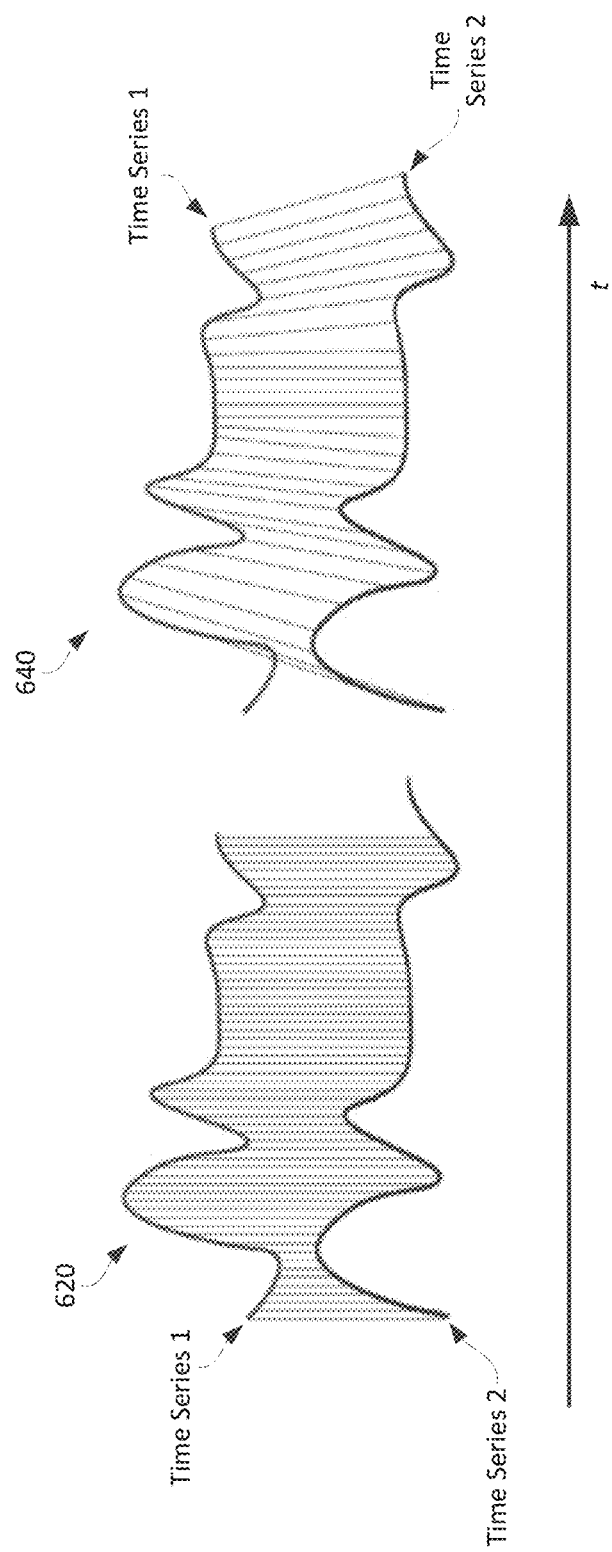
FIG. 6 depicts an example of a correlation of two time series performed using Euclidean distance measures and an example of a correlation of two time series performed using dynamic time warping, in accordance with embodiments of the present disclosure.

FIG. 6 depicts an example of a correlation 620 of two time series (e.g., Time Series 1 and Time Series 2) performed using Euclidean distance measures and an example of a correlation 640 of two time series performed using dynamic time warping, in accordance with embodiments of the present disclosure. As depicted in FIG. 6, the correlation 620 using a Euclidean distance measure compares the time varying signals at the same time instant, whereas the dynamic time warping (DTW) correlation 640 compares samples with similar shapes to minimize the distance between the points. As illustrated in FIG. 6, DTW may be a useful technique to compare two time-varying signals when the local maximums and minimums of the signals being compared do not occur at similar points in time. DTW may perform a warping operation to warp the time scale of Time Series 1 (e.g., a first time graph representing available bandwidth over time) to determine a similarity between Time Series 1 and Time Series 2. (e.g., a second time graph representing available bandwidth over time) Similarly, DTW may warp the time scale of Time Series 2 to determine a similarity between Time Series 1 and Time Series 2.

Figure 7:
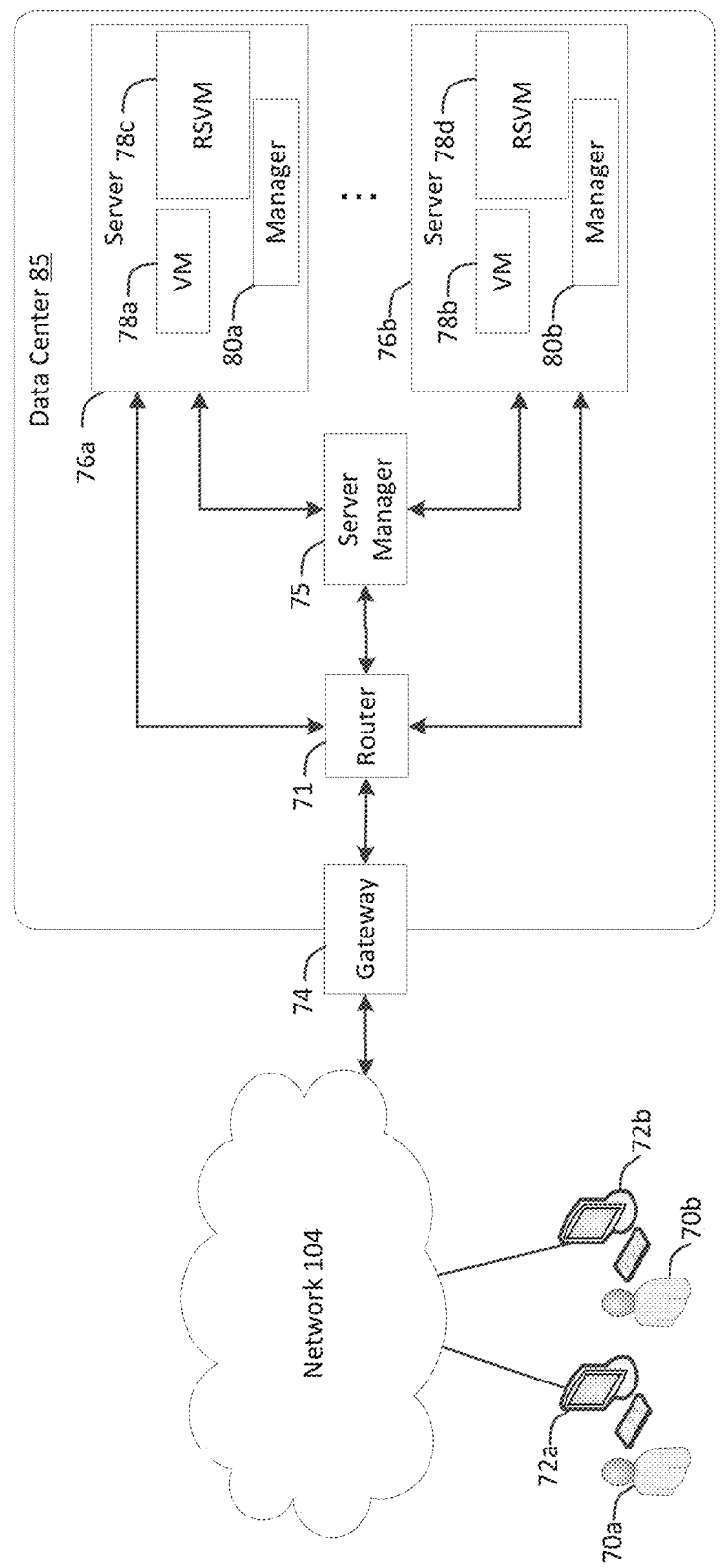
FIG. 7 depicts an example system for sending and providing data over a network, in accordance with various embodiments of the present disclosure.

An example system for sending and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers or other network-connected devices 72a and 72b (which may be referred herein singularly as computer 72 or in the plural as computers 72) via network 104. In various examples, transmitter 100 depicted in FIG. 1 may be an example of a computer or other network-connected device 72a and/or 72b. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are rendition switching virtual machine ("RSVM") instances. The RSVM virtual machine instances 78c and 78d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to network 104. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A method of transmitting data, comprising:
   sending, by a first computing device to a second device over a network, first data at a first bit rate;
   determining, by the first computing device, first time graph data representing a measure of a first network condition of the network;
   determining, by the first computing device, a first correlation between the first time graph data and a first portion of second time graph data representing a first network congestion profile, wherein the first portion of the second time graph data corresponds to a first period of time associated with the first time graph data;
   encoding, by the first computing device, second data at a second bit rate based at least in part on a second portion of the second time graph data, the second portion following the first portion; and
   sending, by the first computing device to the second device over the network, the second data at the second bit rate;
   wherein determining the first correlation comprises:
      adjusting, by the first computing device, a time scale of the first time graph data using dynamic time warping; and
      determining the first correlation between a first waveform of the first time graph data and a second waveform of the second time graph data.

2. The method of claim 1, further comprising:
   generating the first network congestion profile by monitoring at least one of available bandwidth, jitter, latency, packet loss, and round trip time over a second period of time.

3. The method of claim 1, further comprising:
generating the first network congestion profile based at least in part on a receiver estimated maximum bitrate (REMB) message.

4. The method of claim 1, further comprising:
receiving a receiver estimated maximum bitrate (REMB) message;
determining, based at least in part on the REMB message, third time graph data representing a measure of a second network condition of the network, wherein the second network condition is detected over a second period of time; and
determining a second correlation between the third time graph data and fourth time graph data representing a second network congestion profile.

5. The method of claim 4, further comprising:
determining, based at least in part on the second network congestion profile, a prospective change in an amount of available bandwidth relative to a current amount of available bandwidth;
generating encoded data at a third bit rate, wherein the third bit rate is lower than the second bit rate; and
sending, by the first computing device to the second device over the network, the encoded data over the network to the second device.

6. The method of claim 1, further comprising:
generating the second time graph data of the first network congestion profile by monitoring latency over a second period of time; and
storing the second time graph data in a memory associated with the first computing device.

7. The method of claim 1, further comprising:
determining, by the first computing device, a first similarity score between the first time graph data and the first portion of the second time graph data representing the first network congestion profile;
determining, by the first computing device, a second similarity score between the first time graph data and a second portion of third time graph data representing a second network congestion profile; and
determining, by the first computing device, a correspondence between the first time graph data representing the measure of the first network condition and the first network congestion profile based at least in part on the first similarity score being higher than the second similarity score.

8. A computing device, comprising:
at least one processor; and
a non-transitory computer-readable memory configured in communication with the at least one processor and storing instructions that, when executed by the at least one processor, cause the at least one processor to perform a method comprising:
sending first data over a network at a first bit rate to a second device;
determining first time graph data representing a measure of a first network condition of the network;
determining a first correlation between the first time graph data and a first portion of second time graph data representing a first network congestion profile, wherein the first portion of the second time graph data corresponds to a first period of time associated with the first time graph data;
determining a second bit rate based at least in part on a second portion of the second time graph data, the second portion following the first portion; and
sending second data at the second bit rate over the network to the second device;
wherein determining the first correlation comprises:
adjusting a time scale of the first time graph data using dynamic time warping; and
determining the first correlation between a first wave form of the first time graph data and a second waveform of the second time graph data.

9. The computing device of claim 8, wherein the instructions, when executed by the at least one processor, are effective to perform the method further comprising:
generating the first network congestion profile by monitoring at least one of available bandwidth, jitter, latency, packet loss, and round trip time over a second period of time.

10. The computing device of claim 8, wherein the instructions, when executed by the at least one processor, are effective to perform the method further comprising:
generating the first network congestion profile based at least in part on a receiver estimated maximum bitrate (REMB) message.

11. The computing device of claim 8, wherein the instructions, when executed by the at least one processor, are effective to perform the method further comprising:
receiving a receiver estimated maximum bitrate (REMB) message;
determining, based at least in part on the REMB message, third time graph data representing a measure of a second network condition of the network, wherein the second network condition is detected over a second period of time; and
determining a second correlation between the third time graph data and fourth time graph data representing a second network congestion profile.

12. The computing device of claim 11, wherein the instructions, when executed by the at least one processor, are effective to perform the method further comprising:
determining, based at least in part on the second network congestion profile, a prospective change in an amount of available bandwidth relative to a current amount of available bandwidth;
generating encoded data at a third bit rate, wherein the third bit rate is lower than the second bit rate; and
sending the encoded data over the network to the second device.

13. The computing device of claim 8, wherein the instructions, when executed by the at least one processor, are effective to perform the method further comprising:
generating the second time graph data of the first network congestion profile by monitoring latency over a second period of time; and
storing the second time graph data in a memory associated with the computing device.

14. The computing device of claim 8, wherein the instructions, when executed by the at least one processor, are effective to perform the method further comprising:
determining third time graph data representing a measure of a second network condition of the network over a second period of time, wherein the second network condition indicates a lower amount of available bandwidth relative to the first network condition, wherein the lower amount of available bandwidth results from retransmission of packets due to packet loss on the network; and
determining a second correlation between the third time graph data and fourth time graph data representing a second network congestion profile.

15. The computing device of claim 8, wherein the instructions, when executed by the at least one processor, are effective to perform the method further comprising:
  determining, by the computing device, a first similarity score between the first time graph data and the first portion of the second time graph data representing the first network congestion profile;
  determining, by the computing device, a second similarity score between the first time graph data and a second portion of third time graph data representing a second network congestion profile; and
  determining, by the computing device, a correspondence between the first time graph data representing the measure of the first network condition and the first network congestion profile based at least in part on the first similarity score being higher than the second similarity score.

16. A method of transmitting data, comprising:
  sending, by a first computing device to a second device over a network, first data at a first bit rate;
  determining, by the first computing device, first time graph data representing a measure of a first network condition of the network;
  determining, by the first computing device, second time graph data representing a first network congestion profile stored in a non-transitory memory of the first computing device;
  adjusting, by the first computing device, a time scale of the first time graph data using dynamic time warping;
  determining a first correlation between a first waveform of the first time graph data and a first portion of a second waveform of the second time graph data;
  encoding, by the first computing device, second data at a second bit rate based at least in part on a second portion of the second time graph data, the second portion following the first portion; and
  sending, by the first computing device to the second device over the network, the second data at the second bit rate.

17. The method of claim 16, further comprising:
generating the first network congestion profile based at least in part on a receiver estimated maximum bitrate (REMB) message.

18. The method of claim 16, further comprising:
receiving a receiver estimated maximum bitrate (REMB) message;
  determining, based at least in part on the REMB message, third time graph data representing a measure of a second network condition of the network; and
  determining a second correlation between the third time graph data and fourth time graph data representing a second network congestion profile.

19. The method of claim 16, further comprising:
generating the first network congestion profile by monitoring at least one of available bandwidth, jitter, latency, packet loss, and round trip time over a second period of time.

* * * * *